United States Patent
Liu

(10) Patent No.: US 7,988,454 B1
(45) Date of Patent: Aug. 2, 2011

(54) CARD CONNECTOR ASSEMBLY FOR PORTABLE ELECTRONIC DEVICE

(75) Inventor: Man-Tian Liu, Shenzhen (CN)

(73) Assignees: Fu Tai Hua Industry (ShenZhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/868,684

(22) Filed: Aug. 25, 2010

(30) Foreign Application Priority Data

Mar. 30, 2010 (CN) .......................... 2010 1 0135904

(51) Int. Cl.
  *H01R 11/30* (2006.01)
(52) U.S. Cl. ......................................................... 439/38
(58) Field of Classification Search .................... 439/38, 439/39, 326
  See application file for complete search history.

(56) References Cited

U.S. PATENT DOCUMENTS

| | | | | |
|---|---|---|---|---|
| 5,025,919 A * | 6/1991 | Brinker et al. | ............... | 206/214 |
| 5,323,291 A * | 6/1994 | Boyle et al. | ............... | 361/679.42 |
| 5,434,743 A * | 7/1995 | Hosoya et al. | ............ | 361/679.32 |
| 5,557,562 A * | 9/1996 | Yoshiharu et al. | ........ | 361/679.41 |
| 5,603,629 A * | 2/1997 | DeFrasne et al. | ............. | 439/331 |
| 5,959,835 A * | 9/1999 | Dohi et al. | ............... | 361/679.41 |
| 5,980,294 A * | 11/1999 | Kanda et al. | ................... | 439/326 |
| 6,236,571 B1 * | 5/2001 | Dohi et al. | .................... | 361/727 |
| 6,424,118 B1 * | 7/2002 | Tu | ................................. | 320/115 |
| 6,461,196 B2 * | 10/2002 | Wilson et al. | ................. | 439/633 |
| 6,976,882 B2 * | 12/2005 | Kernan | ......................... | 439/638 |
| 7,090,536 B2 * | 8/2006 | Choy | ............................. | 439/630 |
| 7,093,764 B1 * | 8/2006 | Valenzuela et al. | ........... | 235/486 |
| 7,264,495 B2 * | 9/2007 | Zuo et al. | ...................... | 439/326 |
| 7,344,401 B2 * | 3/2008 | Zuo et al. | ...................... | 439/326 |
| 7,354,290 B2 * | 4/2008 | Zhan et al. | .................... | 439/326 |
| 7,381,094 B2 * | 6/2008 | Miyao et al. | .................. | 439/630 |
| 7,621,783 B1 * | 11/2009 | Lai | ................................ | 439/630 |
| 7,798,858 B1 * | 9/2010 | Zuo | ................................ | 439/630 |
| 2004/0092149 A1 * | 5/2004 | Scuteri et al. | ................. | 439/326 |
| 2005/0155830 A1 * | 7/2005 | Huang | ..................... | 191/12.2 R |
| 2005/0208813 A1 * | 9/2005 | Trout et al. | .................... | 439/326 |
| 2006/0116025 A1 * | 6/2006 | Choy | ............................. | 439/630 |
| 2007/0111552 A1 * | 5/2007 | Ehr et al. | ......................... | 439/38 |

\* cited by examiner

*Primary Examiner* — T C Patel
*Assistant Examiner* — Vladimir Imas
(74) *Attorney, Agent, or Firm* — Zhigang Ma

(57) ABSTRACT

A portable electronic device includes a main body and a card connector assembly mounted inside of the main body. The card connector assembly includes a base including a protrusion and a protrusion plate, a cover, and a movable plate. The protrusion includes a plurality of contacts. The protrusion plate includes an electromagnet. The cover is rotatably connected to the base, and includes a retaining member for retaining an electronic card. The movable plate is slidably connected to the protrusion plate, and is made of magnetic material. When in use, the cover is rotated until the electronic card contacts the contacts, the electronic device controls to power for the electromagnet, the electromagnet generates a magnetic field which drives the movable plate to slide toward the protrusion along the protrusion plate until the movable plate moves below the cover to prevent the cover from rotating in one direction.

8 Claims, 5 Drawing Sheets

CARD CONNECTOR ASSEMBLY FOR PORTABLE ELECTRONIC DEVICE

BACKGROUND

1. Technical Field

The present disclosure relates to portable electronic devices and, particularly, to a portable electronic device with a card connector assembly.

2. Description of Related Art

A card connector assembly is often installed in an electronic device, such as a notebook computer. The electronic device can thus read data from or write data to an electronic card.

When removing or inserting the electronic card, a back cover of the portable electronic device usually needs to be removed. After frequently detaching the back cover, it may become loose or wear out and may tend to be detached unintentionally from the electronic device.

Therefore, what is needed is a portable electronic device which utilizes the card connector assembly to overcome the described shortcoming.

DETAILED DESCRIPTION

Figure 1:
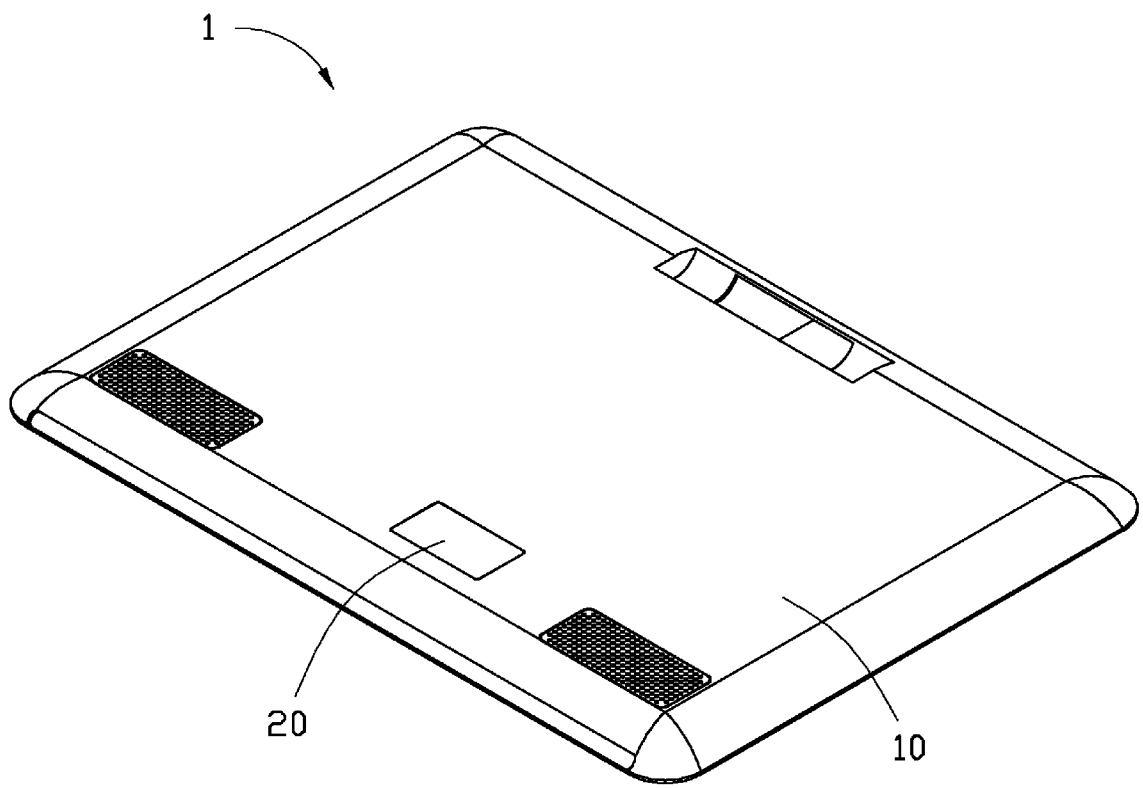
FIG. 1 is an isometric view of a portable electronic device in accordance with an exemplary embodiment.
Figure 2:
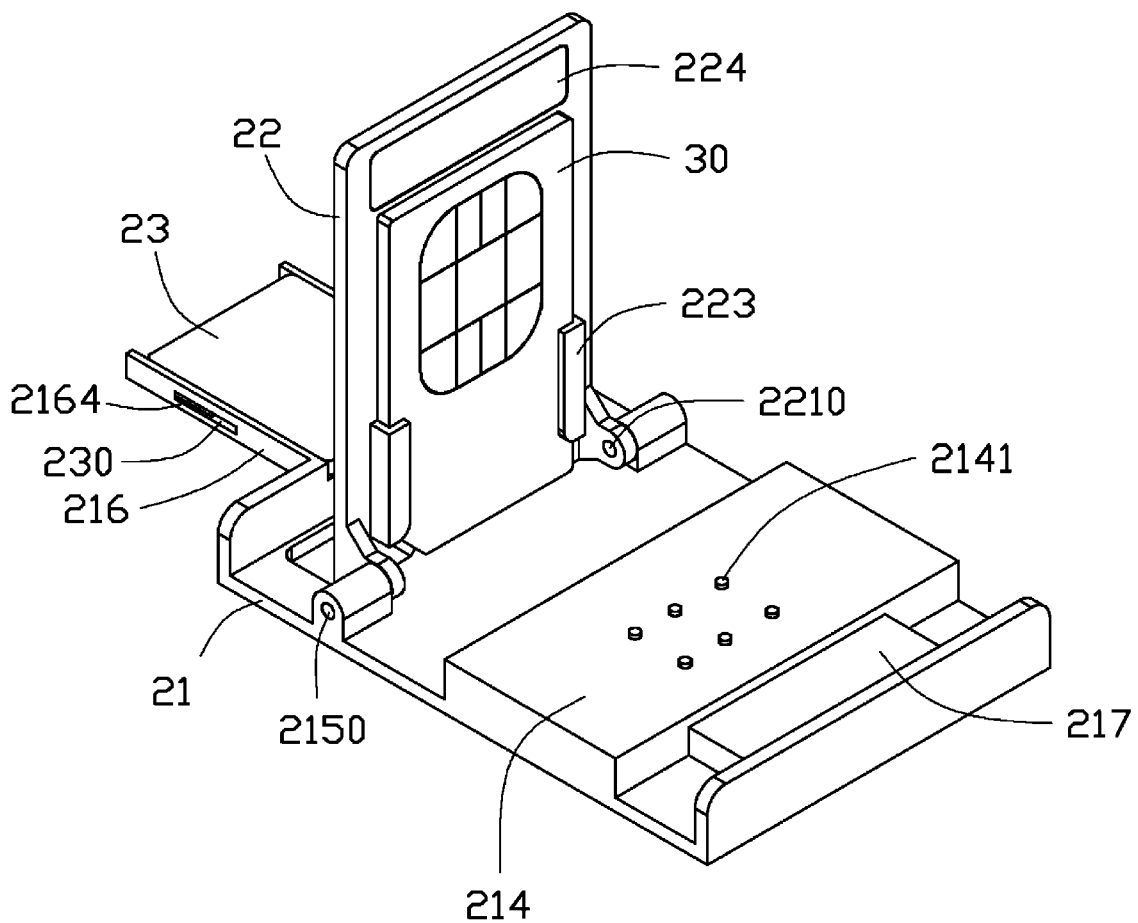
FIG. 2 is an isometric view of a card connector assembly of the portable electronic device of FIG. 1.
Figure 3:
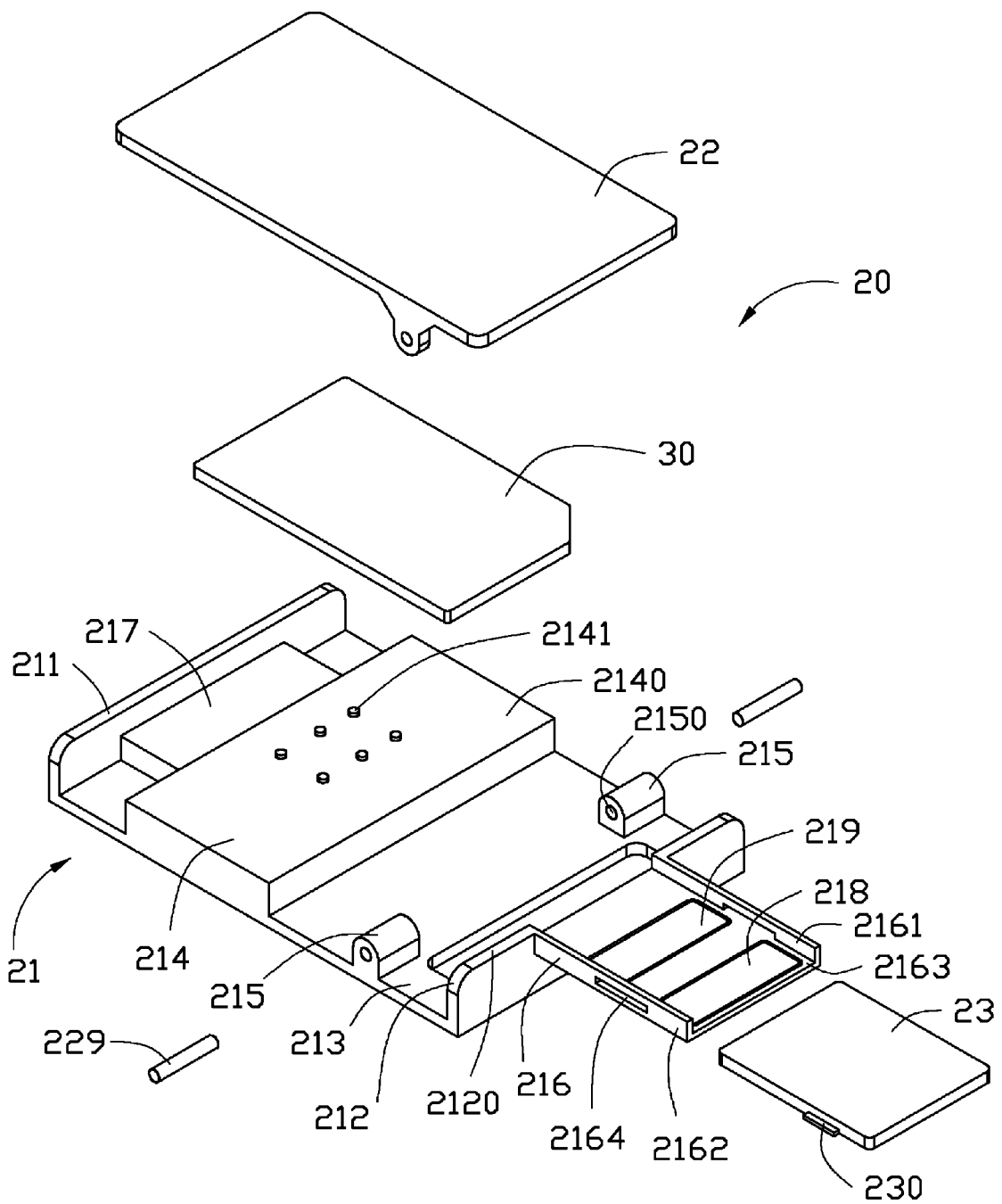
FIG. 3 is an exploded view of the card connector assembly of FIG. 2.
Figure 4:
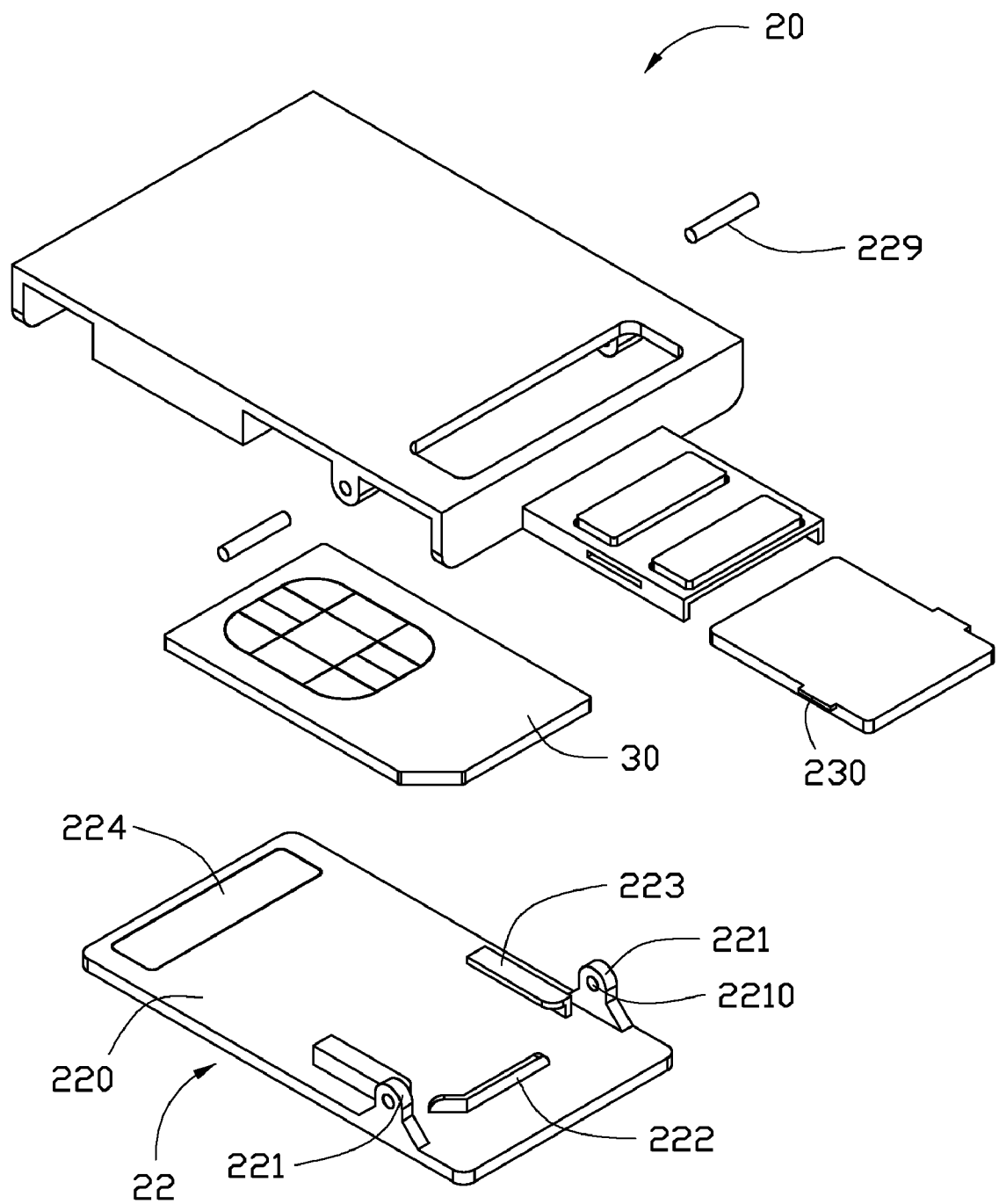
FIG. 4 is an exploded view of the card connector assembly of FIG. 2, viewed from another aspect.

Embodiments of the present disclosure will now be described in detail below, with reference to the accompanying drawings.

Referring to FIGS. 1-4, an embodiment of a portable electronic device 1 is illustrated. The portable electronic device 1 includes a main body 10 and a card connector assembly 20 mounted inside of the main body 10. The card connector assembly 20 is configured for receiving an electronic card 30. In the embodiment, the portable electronic device 1 is a notebook computer. In other embodiments, the portable electronic device 1 may be a mobile phone, or a digital camera, etc.

The card connector assembly 20 includes a base 21, a cover 22 rotatably connected to the base 21, and a movable plate 23 slidably connected to the base 21.

The base 21 includes a first sidewall 211, a second sidewall 212, and a bottom 213 connecting the sidewalls 211 and 212. A protrusion 214 protrudes from the bottom 213. The first sidewall 211 and the second sidewall 212 are substantially perpendicular to the bottom 213. A first permanent magnet 217 is placed between the protrusion 214 and the first sidewall 211. The protrusion 214 includes a top surface 2140. A number of contacts 2141 are mounted on the top surface 2140. The contacts 2141 of the top surface 2140 are configured for respectively making contact with the contacts (not shown) of the electronic card 30 to establish an electronic connection. In the embodiment, the number of contacts 2141 of the top surface 2140 is six.

The base 21 further includes two opposing axle receivers 215 protruding from the bottom 213 and adjacent to the second sidewall 212. Two axle holes 2150 are respectively defined in the two opposing axle receivers 215 arranged on one end of the base 21, adjacent to the second sidewall 212.

The base 21 further includes a protrusion plate 216 perpendicularly extending from an end 2120 of the second sidewall 212 and away from the second sidewall 212. The protrusion plate 216 includes two opposing guide walls 2161 and 2162, and a bottom 2163 between the guide walls 2161 and 2162. Two opposing sliding grooves 2164 are respectively formed in the middle portion of two opposing guide walls 2161, 2162 along a lengthwise direction perpendicular to the second sidewall 212. The two sliding grooves 2164 are configured for providing a slideway for the movable plate 23. A third permanent magnet 218 is arranged on the bottom 2163 away from the second sidewall 212. An electromagnet 219 is arranged on the bottom 2163 adjacent to the second sidewall 212.

The cover 22 includes a lower surface 220, two opposing extending arms 221 extending from the lower surface 220, two opposing retaining members 223 extending from the lower surface 220, and a stopper 222 extending from the lower surface 220.

Two axle holes 2210 are respectively defined in two opposing extending arms 221 arranged on one end of the cover 22. The base 21 further incorporates two shafts 229. The two shafts 229 respectively pass through the two axle holes 2150 and 2210, thereby rotatably connecting the cover 22 to the base 21. The electronic card 30 can be inserted into the cover 22 along the two opposing retaining members 223 until it is contacts the stopper 222. A second permanent magnet 224 is arranged on the lower surface 220 away from the stopper 222, and is opposite to the first permanent magnet 217.

Two tabs 230 extend from two sides of the movable plate 23 along a lengthwise direction, and are respectively received into the two opposing sliding grooves 2164, thereby slidably connecting the movable plate 23 to the protrusion plate 216. The movable plate 23 is made of magnetic material, and is movable along the two sliding grooves 2164 under influence of a magnetic field. In an initial state, the movable plate 23 is attracted by the third permanent magnet 218 to be located in a position of the protrusion plate 216 away from the second sidewall 212.

When assembling, the base 21 is attached inside the main body 10, the cover 22 is rotatably connected to the base 21 by the two shafts 229 and two axle holes 2150 and 2210, and the movable plate 23 is slidably connected to the base 21 by the two tabs 230 sliding in the two sliding grooves 2164.

Figure 5:
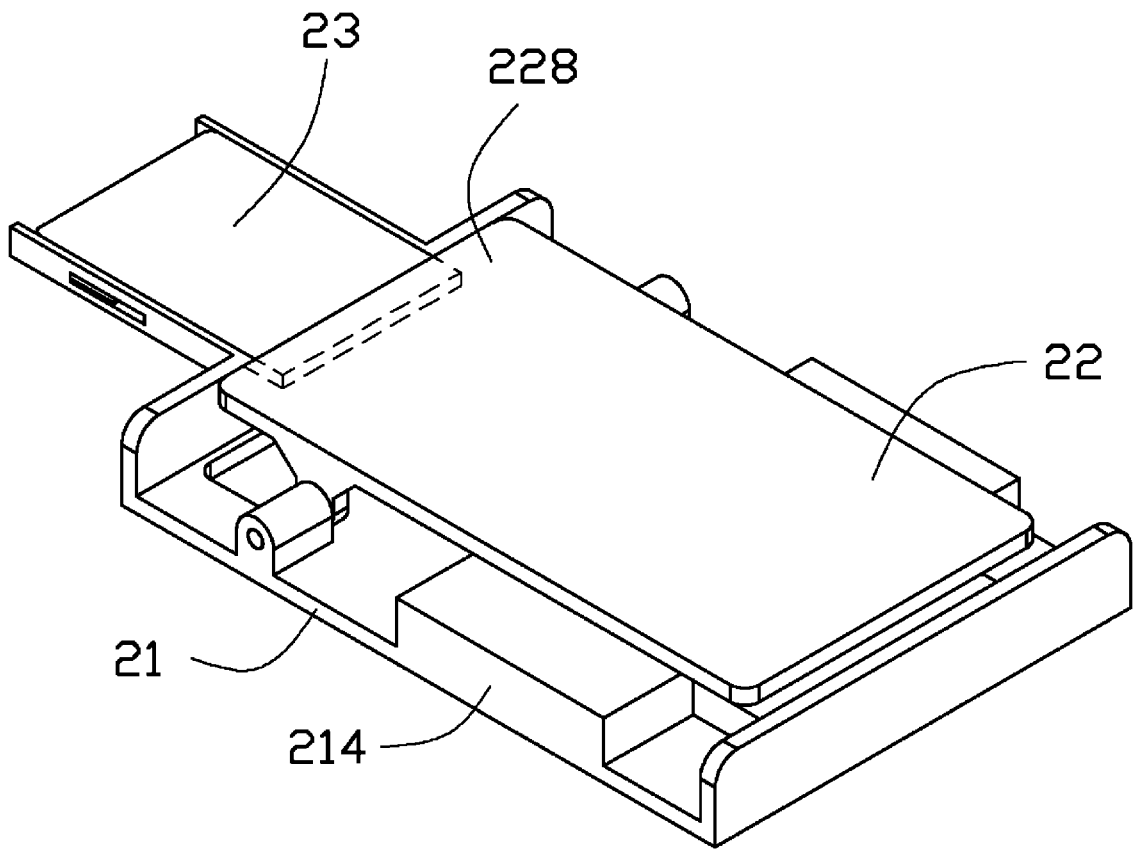
FIG. 5 shows that the card connector assembly of FIG. 2 is closed.

Referring also to FIG. 5, when in use, the electronic card 30 is inserted into the cover 22 along the two retaining members 223 until the electronic card 30 is stopped by the stopper 222. The cover 22 is then manually rotated until the first permanent magnet 217 attracts the second permanent magnet 224 at which time the magnetic attraction completes the rotation of the cover 22 to a closed position, and the electronic card 30 electrically contacts the contacts 2141 of the top surface 2140. A processor (not shown) of the main body 10 generates an electrical signal after detecting this electrical connection, and controls a power unit (not shown) to power the electromagnet 219 to generate a magnetic field. The magnetic field attracts the movable plate 23 to move toward the second sidewall 212. Because the attractive force applied to the movable plate 23 from the magnetic field exceeds the attractive force from the third permanent magnet 218, the movable plate 23 is driven to move along the protrusion plate 216 toward the second sidewall 212 until the movable plate 23 moves below the cover 22. According to the lever principle, the cover 22 is covered the base 21 by the movable plate 23 to prevent the cover 22 from rotating in one direction.

When attempting to remove the electronic card 30 from the card connector assembly 20, a user can break the electrical connection between the electronic card 30 and the contacts 2141. In the embodiment, the user breaks the electrical connection between the electronic card 30 and the contacts 2141 by closing the portable computer 1. In another embodiment, the user can use software to break the electrical connection between the electronic card 30 and the contacts 2141. The processor of the main body 10 then controls the power unit to cut off the power for the electromagnet 219. Then the electromagnet 219 cannot generate the attractive force against the movable plate 23. The movable plate 23 is attracted by the third permanent magnet 218 and slides along the protrusion plate 216 avoiding contacting with the second sidewall 212. The cover 22 thus frees the limitation from the movable plate 23. Then, the user can depress counter-clockwise a portion 228 of the cover 22 between the second sidewall 212 and the axle receiver 215 until the attractive force between the first permanent magnet 217 and the second permanent magnet 224 is overcome. The cover 22 then rotates away from the base 21. The user can then remove the electronic card 23 from the card connector assembly 20.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A portable electronic device comprising:
   a main body; and
   a card connector assembly mounted inside of the main body, and comprising:
      a base comprising a protrusion and a protrusion plate, wherein the protrusion comprises a plurality of contacts mounted on a top surface thereof, the protrusion plate comprises an electromagnet arranged on a bottom of the base adjacent to the protrusion;
      a cover rotatably connected to the base, and comprising a retaining member for retaining an electronic card; and
      a movable plate slidably connected to the protrusion plate, and made of magnetic material;
   wherein, when in use, the cover is rotated by an external force until the electronic card contacts the contacts, the electronic device controls to power for the electromagnet after detecting the contacting between the electronic card and the contacts, the electromagnet generates a magnetic field which drives the movable plate to slide toward the protrusion along the protrusion plate until the movable plate moves below the cover to prevent the cover from rotating in one direction.

2. The portable electronic device as described in claim 1, wherein the base comprises a first sidewall away from the protrusion plate, a second sidewall adjacent to the protrusion plate, and a bottom connecting the first sidewall and the second sidewall, the protrusion perpendicularly protrudes from the bottom adjacent to the first sidewall.

3. The portable electronic device as described in claim 2, wherein a first permanent magnet is placed between the protrusion and the first sidewall, a second permanent magnet is arranged on a lower surface of the cover, and is opposing to the first permanent magnet, when the cover is manually rotated counter clockwise in a predetermined position, the first permanent magnet attracts the second permanent magnet to cause the cover to cover the base.

4. The portable electronic device as described in claim 3, wherein the base further incorporates two shafts and comprises two opposing axle receivers protruding from the bottom thereof, two opposing axle holes are respectively defined in the two opposing axle receivers, the cover further comprises two opposing extending arms extending from the lower surface, two axle holes are respectively defined in the two opposing extending arms, the two shafts respectively pass through the two axle holes of the two opposing axle receivers and the two opposing extending arms, thereby rotatably connecting the cover to the base.

5. The portable electronic device as described in claim 2, wherein the protrusion plate perpendicularly extends from an end of the second sidewall and away from the second sidewall of the base.

6. The portable electronic device as described in claim 5, wherein the protrusion plate comprises two opposing guide walls and a bottom between the guide walls, two opposing sliding grooves are formed in a middle portion of the two opposing guide walls along a lengthwise direction, the movable plate comprises two opposing tabs extending from two opposing sides thereof, the two opposing tabs are received in the two sliding grooves, and are slidable along the two sliding grooves, thereby slidably connecting the movable plate to the protrusion plate.

7. The portable electronic device as described in claim 6, wherein the protrusion plate comprises a third permanent magnet arranged on the bottom thereof and away from the second sidewall of the base, when the electromagnet is cut off to power, the magnetic field disappears, the movable plate is attracted by the third permanent magnet and slides along the protrusion plate avoiding contacting with the second sidewall.

8. The portable electronic device as described in claim 3, wherein the cover further comprises two opposing retaining members extending from the lower surface, and a stopper extending from the lower surface and away from the second permanent magnet, the electronic card is inserted into the lower surface along the two retaining members until the electronic card contacts the stopper.

* * * * *